(12) United States Patent
Hirai

(10) Patent No.: US 7,262,803 B2
(45) Date of Patent: Aug. 28, 2007

(54) CAMERA WITH ADJUSTABLE AUTO-FOCUS DETECTION AREA

(75) Inventor: Keisuke Hirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 911 days.

(21) Appl. No.: 10/612,586

(22) Filed: Jul. 1, 2003

(65) Prior Publication Data

US 2004/0012709 A1    Jan. 22, 2004

(30) Foreign Application Priority Data

| Jul. 3, 2002 | (JP) | ............................. 2002-194967 |
| May 28, 2003 | (JP) | ............................. 2003-151131 |

(51) Int. Cl.
    *H04N 5/232* (2006.01)
(52) U.S. Cl. ..................................................... 348/345
(58) Field of Classification Search ............... 348/345, 348/349, 350
    See application file for complete search history.

(56) References Cited

U.S. PATENT DOCUMENTS

| 5,187,585 | A | * | 2/1993 | Kaneda et al. | .............. 348/347 |
| 5,196,929 | A | * | 3/1993 | Miyasaka | .................. 348/169 |
| 6,088,060 | A | * | 7/2000 | Suda et al. | .................. 348/350 |
| 6,246,437 | B1 | * | 6/2001 | Kaneda | .................. 348/333.03 |
| 6,278,489 | B1 | * | 8/2001 | Hirasawa | ..................... 348/348 |
| 6,670,991 | B1 | * | 12/2003 | Takagi et al. | ............... 348/349 |
| 6,812,968 | B1 | * | 11/2004 | Kermani | ..................... 348/345 |
| 6,906,751 | B1 | * | 6/2005 | Norita et al. | ............... 348/349 |

FOREIGN PATENT DOCUMENTS

| EP | 1017232 A1 | 7/2000 |
| EP | 1188309 A0 | 3/2002 |

* cited by examiner

*Primary Examiner*—Vivek Srivastava
*Assistant Examiner*—James M. Hannett
(74) *Attorney, Agent, or Firm*—Morgan & Finnegan, LLP

(57) ABSTRACT

An optical apparatus which can be focused on an object included at an arbitrary position in an image-taking area with simple operations, is disclosed. The optical apparatus according to the present invention comprises a focusing state calculating circuit which derives information indicating a focusing state of an optical system based on an output signal from an image-pickup area which corresponds to part of an image-pickup device, and a storage circuit which stores the position of the image-pickup area in the image-pickup device. The optical apparatus also comprises a setting system which moves the image-pickup area, stores the position of the image-pickup area in the storage circuit, and sets an image-pickup area which has been stored in the storage circuit as the image-pickup area in performing focus adjustment control.

4 Claims, 11 Drawing Sheets

CAMERA WITH ADJUSTABLE AUTO-FOCUS DETECTION AREA

BACKGROUND OF THE INVENTION

1. Field of the Invention

The present invention relates to an optical apparatus which is provided with an autofocus (AF) function, such as a video camera.

2. Description of the Related Art

Optical apparatuses provided with an AF function including a video camera mainly employ an automatic focusing method (hereinafter referred to as "an. AF method") in which part of a video signal (high-frequency components of a video signal) indicating sharpness of an object is extracted and evaluated to adjust the focus of an image-taking optical system. An example of operation in the AF method of this type is described with reference to FIG. 11.

FIG. 11 is a block diagram showing the structure of a video camera. In FIG. 11, reference numeral 101 shows the video camera, 102 shows a focus lens included in an image-taking optical system, not shown, and 103 shows an image-pickup device which converts light from the image-taking optical system into an electrical signal for output as a video signal.

Reference numeral 104 shows a video signal processing circuit which processes the video signal output from the image-pickup device 103, 105 shows an AF evaluating circuit which calculates a degree of sharpness as an AF evaluation value based on the processed video signal, and 106 shows a control circuit which calculates a target position of the focus lens 102 based on the degree of sharpness input thereto from the AF evaluating circuit 105.

Reference numeral 107 shows a motor which drives the focus lens 102 in accordance with a control signal from the control circuit 106, and 108 shows an object distance detector which detects the position of the focus lens 102 and outputs a feedback signal indicating the current position of the focus lens 102 to the control circuit 106.

Light passing through the focus lens 102 forms an image on an image-pickup plane of the image-pickup device 103. The image-pickup device 103 photoelectrically converts the object image and outputs the resulting video signal. The video signal processing circuit 104 processes the video signal input thereto from the image-pickup device 103 through a filter or the like to optimize the video signal. The AF evaluating circuit 105 calculates the degree of sharpness as an AF evaluation value in a focus detecting area defined in the center of an image-taking area. Since the focus detecting area is defined in the center of the image-taking area, the image-taking optical system is always focused on an object positioned in the center of the image-taking area.

The object distance detector 108 is mechanically coupled to the focus lens 102 to detect the position of the focus lens 102 and output a position feedback signal to the control circuit 106. The control circuit 106 calculates a target position of the focus lens 102 based on the degree of sharpness calculated by the AF evaluating circuit 105 and the position feedback signal provided by the object distance detector 108, and outputs a position control signal to the motor 107.

The motor 107 drives the focus lens 102 in accordance with the position control signal input thereto from the control circuit 106. In this manner, the automatic focusing control of the focus lens 102 is performed.

The video camera shown in FIG. 11, however, suffers from the following disadvantages since it is not provided with a function of selecting the focus detecting area or a function of storing the selected focus detecting area.

Specifically, the focus detecting area is always positioned in the center of the image-taking area, so that when an image of an object needs to be taken off the center in the image-taking area, either of two approaches must be taken, that is, the automatic focusing control is not activated and the focus lens is manually adjusted, or the automatic focusing control is activated and the video camera is panned or tilted to position the object in the center of the image-taking area. As a result, the operation for the focusing is complicated and other operations may be adversely affected.

SUMMARY OF THE INVENTION

It is an object of the present invention to provide an optical apparatus provided with an AF function which can be focused on an object included at an arbitrary position in an image-taking area with simple operations.

To attain the aforementioned object, the optical apparatus according to the present invention includes an optical system which has a focus lens and forms an object image, an image-pickup device which receives the object image formed by the optical system and photoelectrically converts the object image, a focusing state calculating circuit which derives information indicating a focusing state of the optical system based on an output signal from an image-pickup area which corresponds to part of the image-pickup device, and a storage circuit which stores the position of the image-pickup area in the image-pickup device.

The optical apparatus also includes a setting system which moves the image-pickup area, stores the position of the image-pickup area in the storage circuit, and sets an image-pickup area which has been stored in the storage circuit as the image-pickup area in performing focus adjustment control.

The setting system includes, for example, a first switch which is operated to instruct the image-pickup area in the image-pickup device to be moved, a second switch which is operated to instruct a position of the image-pickup area to be stored in the storage circuit, and a third switch which is operated to instruct the image-pickup area to be switched. The setting system also includes a control circuit which performs focus adjustment control by driving the focus lens based on the information derived by the focusing state calculating circuit and is electrically connected to the first switch, the second switch, and the third switch to operate in accordance with a state of each of the switches.

The control circuit moves the image-pickup area in response to operation of the first switch, and stores, in response to operation of the second switch, the position of the image-pickup area at the time of that operation in the storage circuit. In addition, the control circuit sets an image-pickup area which has been stored in the storage circuit as the image-pickup area in accordance with a state of the third switch in performing the focus adjustment control.

These and other characteristics of the optical apparatus according to the present invention will be apparent from the following description of specific embodiments with reference to the drawings.

DETAILED DESCRIPTION OF THE PREFERRED EMBODIMENTS

Embodiments of the present invention are hereinafter described with reference to the drawings.

Embodiment 1

Figure 1:
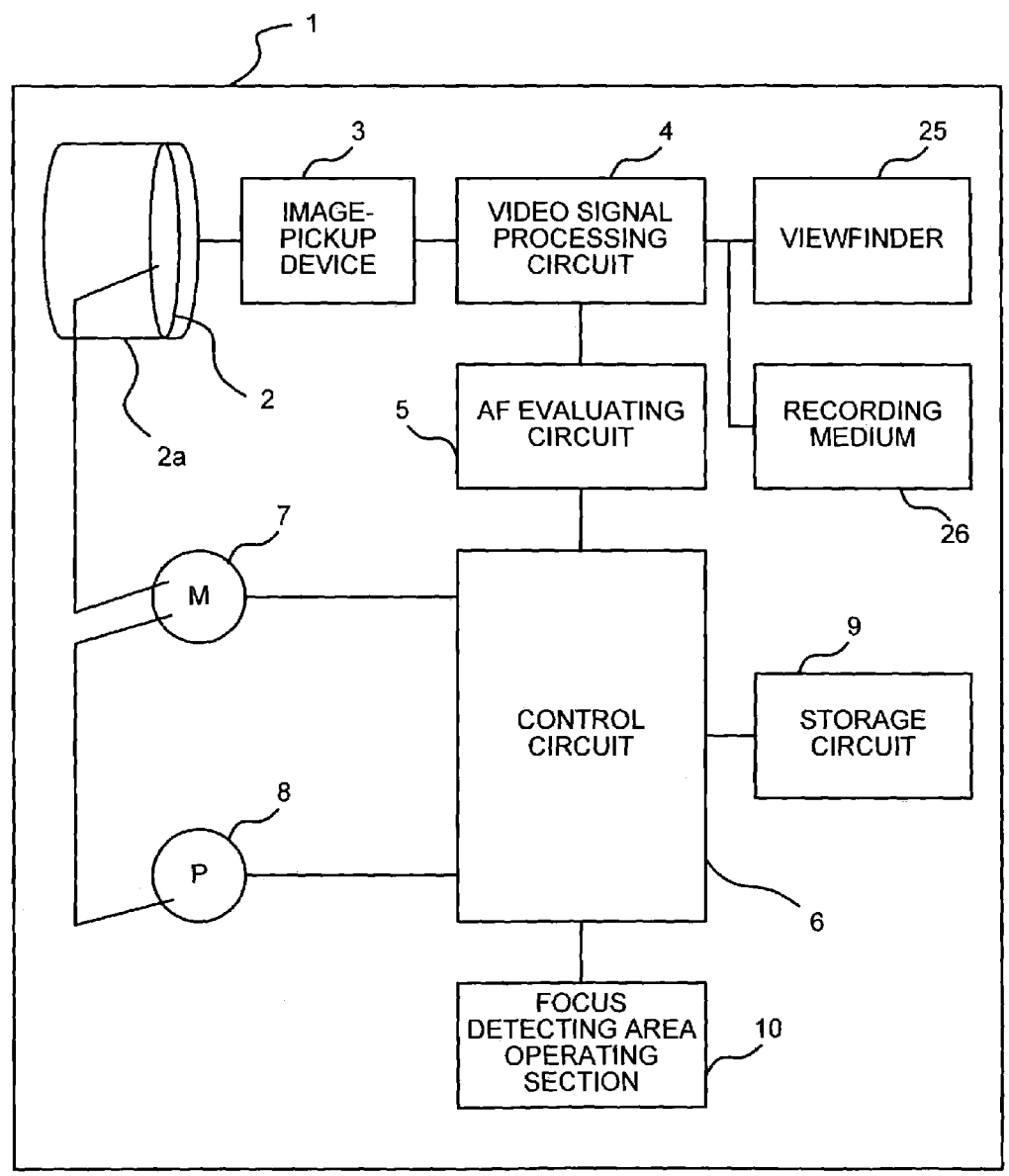
FIG. 1 is a block diagram showing the structure of a video camera according to Embodiment 1 of the present invention.

FIG. 1 is a block diagram showing the structure of a video camera (optical apparatus) which is Embodiment 1 of the present invention. It should be noted that while description is herein made for the video camera, the present invention is applicable to various types of optical apparatuses other than the video camera, including a digital still camera and a film camera which has an image-pickup device for focus adjustment control.

In FIG. 1, reference numeral 1 shows the video camera, 2a shows an image-taking optical system which is formed of a plurality of lenses, and 2 shows a focus lens included in the image-taking optical system 2a.

Reference numeral 3 shows an image-pickup device (photoelectric conversion element) such as a CCD and a CMOS sensor which photoelectrically converts light (object image) from the image-taking optical system to output the resulting video signal.

Reference numeral 4 shows a video signal processing circuit which processes the video signal output from the image-pickup device 3, and 5 shows an AF evaluating circuit that is a focusing state calculating circuit, which calculates a degree of sharpness (high-frequency components of the video signal) as an AF evaluation value based on the processed video signal.

Reference numeral 6 shows a control circuit formed of a CPU or the like which calculates a target position of the focus lens 2 for achieving a state of being in-focus based on the degree of sharpness input thereto from the AF evaluating circuit 5 to control a motor 7. The motor 7 drives the focus lens 2 in an optical axis direction. Reference numeral 8 shows an object distance detector which detects the position of the focus lens 2 and outputs a position feedback signal indicating the current position of the focus lens 2 to the control circuit 6.

Reference numeral 9 shows a storage circuit which stores the position of a focus detecting area that is an image-pickup area corresponding to part of the image-pickup device 3 and other kinds of information. The storage circuit 9 may be either of a volatile storage of which storage contents are erased when the power is turned off or a non-volatile storage of which storage contents are held even when the power is turned off, or both of them may be used therefor.

Reference numeral 10 shows a focus detecting area operating section which is provided with a plurality of operation switches. Reference numeral 25 shows an electronic viewfinder which displays the video signal (object image) processed by the video signal processing circuit 4 and is formed of a liquid crystal panel or the like.

Reference numeral 26 shows a recording medium which records the video signal processed by the video signal processing circuit 4, and is formed of a tape, a semiconductor memory, an optical disk or the like.

In Embodiment 1, the position of a focus detecting area can be arbitrarily (freely) selected in an image-taking area displayed on the electronic viewfinder 25 by operating of the switches in the focus detecting area operating section 10. The focus detecting area is displayed as defined by a rectangular frame or the like on the electronic viewfinder 25 in combination with an object image in the image-taking area.

In actual focusing control, the aforementioned AF evaluation value (degree of sharpness) is calculated by using the output from an image-pickup area on the image-pickup device 3 corresponding to the position of the focus detecting area on the viewfinder 25, and the position of the focus lens 2 is controlled on the basis of the calculated AF evaluation value.

Hereinafter, an image-pickup area on the image-pickup device 3 is also called a "focus detecting area" as well as a focus detecting area on the electronic viewfinder 25.

Specifically, the control circuit 6 performs sampling of the state of switches 11 to 14 for moving the focus detecting area (that is, the image-pickup area) at predetermined time periods, and when any of the switches 11 to 14 is turned on, the control circuit 6 shifts the position of the focus detecting area on the image-pickup device 3 (that is, the image-pickup area for calculating the AF evaluation value) in a direction corresponding to that switch by an amount equal to a predetermined number of pixels.

It should be noted that a plurality of selectable focus detecting areas may be provided previously such that one of them is selected for use through the operation of any of the switches in the focus detecting area operating section 10.

Figure 2:
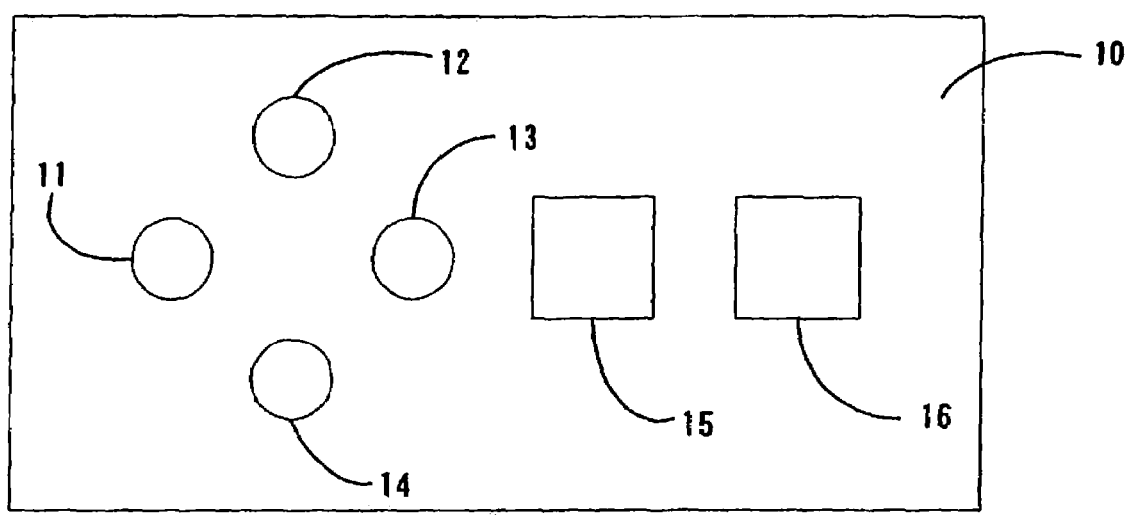
FIG. 2 is a block diagram showing the structure of an operating section in the video camera of Embodiment 1.

FIG. 2 shows the arrangement of the operation switches of the focus detecting area operating section 10 in FIG. 1. In FIG. 2, reference numeral 11 to 14 show the switches (hereinafter referred to as "area moving switches") for moving the focus detecting area. The switches 11, 12, 13, and 14 are provided for moving the focus detecting area to the left, up, right, and down, respectively.

Reference numeral 15 shows an area changing switch for switching two stored focus detecting areas, later described.

Reference numeral 16 shows an area determining switch for determining the focus detecting area to be stored.

In Embodiment 1, the control circuit 6, the area moving switches 11 to 14, the area changing switch 15, and the area determining switch 16 constitute a setting system for setting the focus detecting area. The processing for setting the focus detecting area performed by the control circuit 6 can be classified into processing for storing a focus detecting area and processing for switching focus detecting areas.

First, the general flow of the processing of storing the focus detecting area is described with reference to FIGS. 1 and 2. The states of the respective switches shown in FIG. 2 are monitored by the control circuit 6. When the control circuit 6 receives an electrical signal according to operation of each switch, the control circuit 6 performs processing corresponding to the signal (that is, the switch operation).

During press (turn-on) of each of the area moving switches 11 to 14, the control circuit 6 moves the focus detecting area in the image-taking area (on the image-pickup device 3) in a direction corresponding to the switch. When the area determining switch 16 is turned on, the control circuit 6 assigns the focus detecting area which is selected at that time to the state (on or off) of the area changing switch 15 at that time, and stores the focus detecting area in the storage circuit 9. In other words, in Embodiment 1, two positions of the focus detecting area can be stored by turning on the single area determining switch 16.

Figure 3:
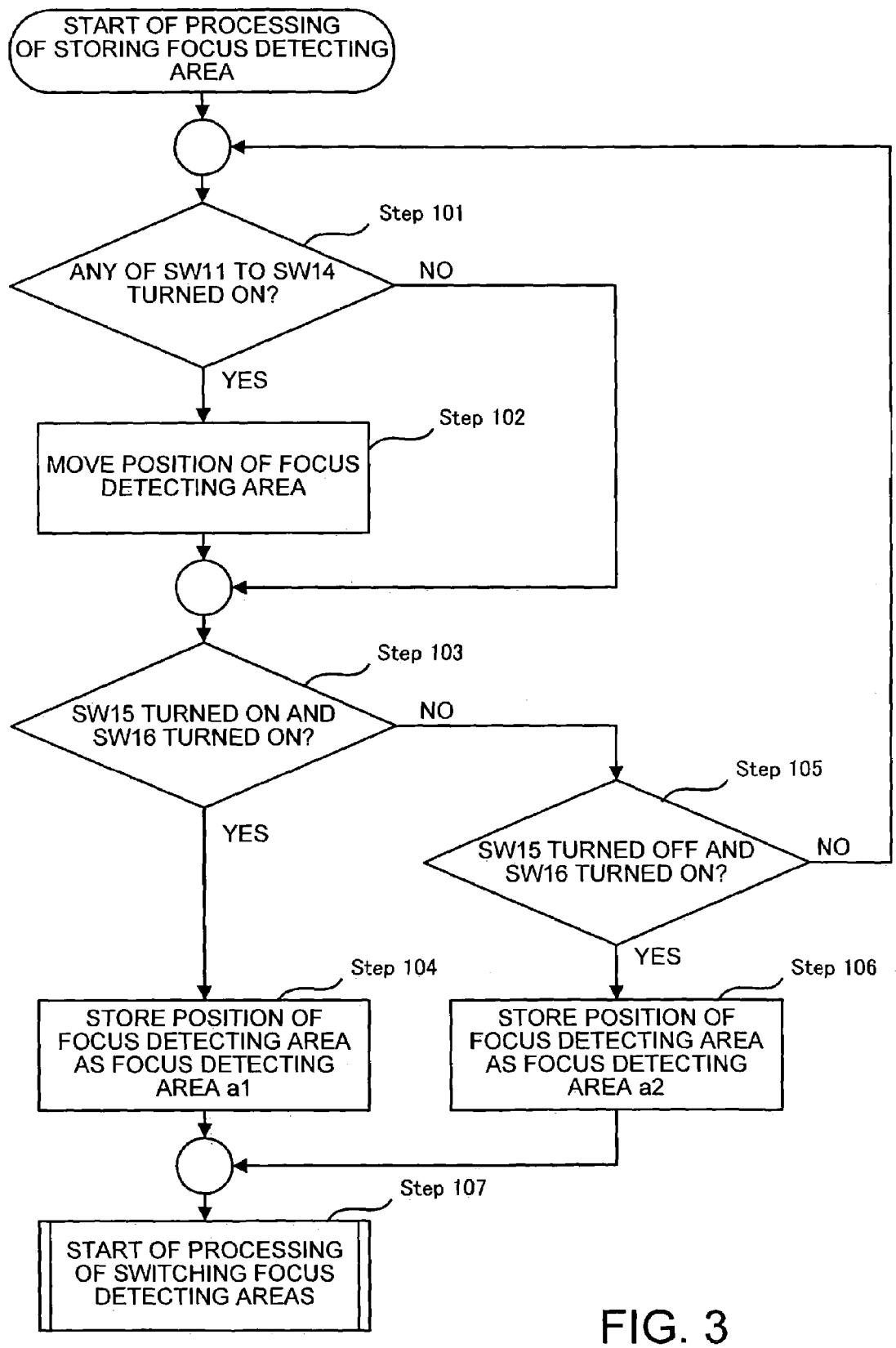
FIG. 3 is a flow chart showing processing of storing a focus detecting area in the video camera of Embodiment 1.

FIG. 3 is a flow chart showing the operation of the processing of storing the focus detecting area performed by the control circuit 6. The following steps are performed in response to power-on of the video camera.

In FIG. 3, when any of the area moving switches 11 to 14 is turned on at step 101, the control circuit 6 moves the focus detecting area in a direction corresponding to the area moving switch which is turned on, at step 102.

When none of the area moving switches 11 to 14 is turned on at step 101, the flow proceeds to step 103 without moving the focus detecting area.

At step 103, when the area determining switch 16 is turned on with the area changing switch 15 turned on, the flow proceeds to step 104 where the control circuit 6 assigns the position of the focus detecting area selected at that point to the turn-on of the area changing switch 15 as a focus detecting area a1 and stores the area a1 in the storage circuit 9.

On the other hand, when the area determining switch 16 is not turned on with the area changing switch 15 turned on at step 103, the flow proceeds to step 105. At step 105, when the area determining switch 16 is turned on with the area changing switch 15 turned off, the flow proceeds to step 106. At step 106, the control circuit 6 assigns the position of the focus detecting area selected at that point to the turn-off of the area changing switch 15 as a focus detecting area a2 and stores the area a2 in the storage circuit 9.

On the other hand, when the area determining switch 16 is not turned on with the area changing switch 15 turned off at step 105, the flow returns to step 101. Subsequent to step 104 and step 106, the flow proceeds to the processing for switching the focus detecting areas (Step 107), later described.

Next, the general flow of the processing of switching the focus detecting areas is described with reference to FIGS. 1 and 2. In taking images, the AF evaluating circuit 5 calculates a degree of sharpness in the focus detecting area a2 previously assigned to the turn-off and stored in the storage circuit 9 during turn-off of the area changing switch 15. The control circuit 6 calculates the target position of the focus lens 2 based on the degree of sharpness and the position of the focus lens 2 derived by the object distance detector 8.

The control circuit 6 controls the motor 7 in accordance with the calculated value to move the focus lens 2 to perform focusing processing. During turn-on of the area changing switch 15, the AF evaluating circuit 5 calculates a degree of sharpness in the focus detecting area a1 previously assigned to the turn-on and stored in the storage circuit 9, and focusing processing of the focus lens 2 is performed.

Figure 4:
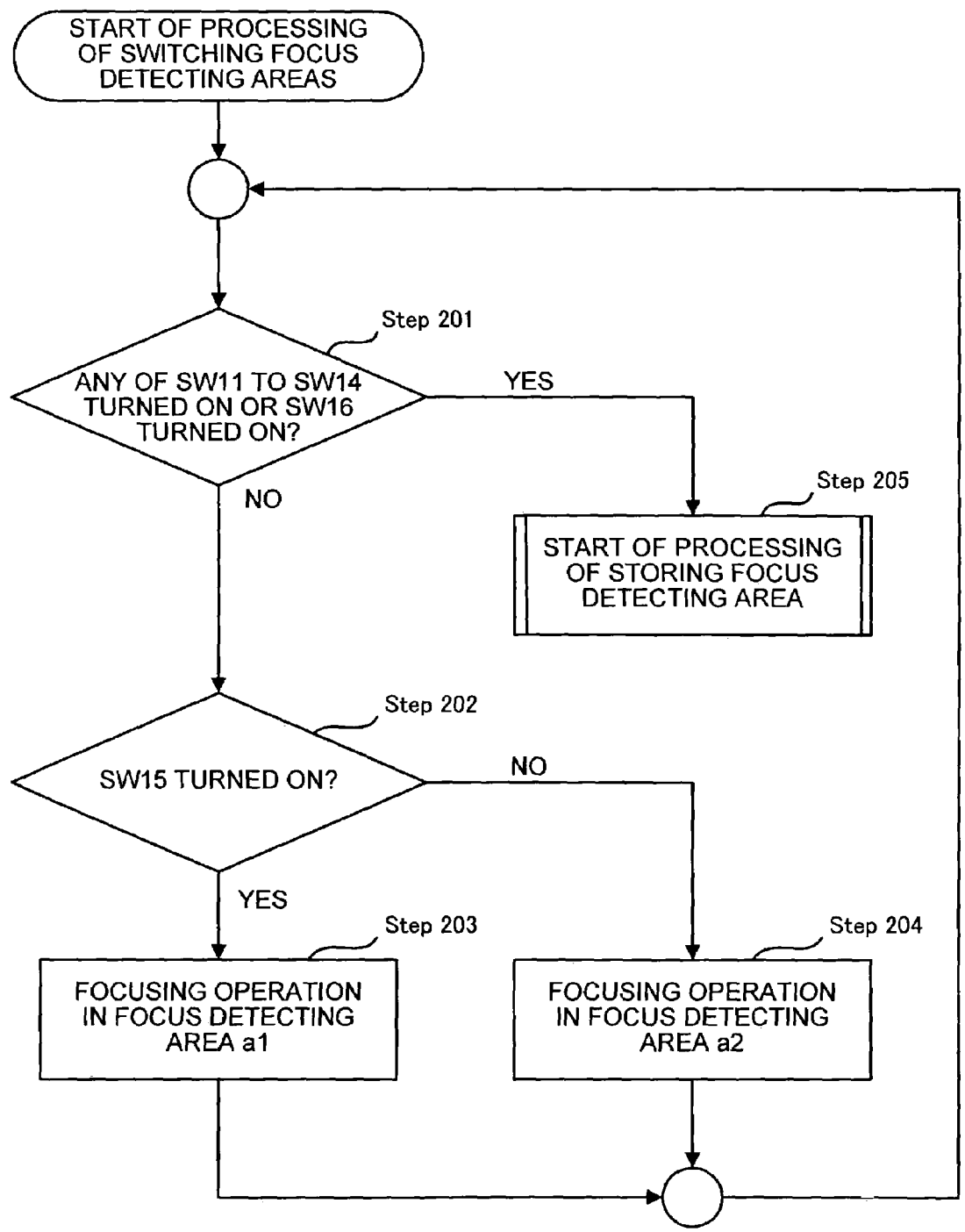
FIG. 4 is a flow chart showing processing of switching focus detecting areas in the video camera of Embodiment 1.

FIG. 4 is a flow chart showing the operation performed by the control circuit 6 in the processing of switching the focus detecting areas.

In FIG. 4, when all of the area moving switches 11 to 14 are turned off at step 201, the flow proceeds to step 202. On the other hand, when any of the area moving switches 11 to 14 is turned on at step 201, the focus detecting area storing processing shown in FIG. 3 is started (Step 205).

At step 202, when the area changing switch 15 is turned on, the flow proceeds to step 203 where focusing processing is performed in the focus detecting area a1 assigned to the turn-on of the area changing switch 15 and stored in the storage circuit 9 in the aforementioned storing processing. On the other hand, when the area changing switch 15 is not turned on at step 202, the flow proceeds to step 204 where focusing processing is performed in the focus detecting area a2 assigned to the turn-off of the area changing switch 15 and stored in the storage circuit 9 in the aforementioned storing processing.

Subsequent to step 203 and step 204, the flow returns to step 201, and focusing processing is performed through the same processing procedure.

Figure 5:
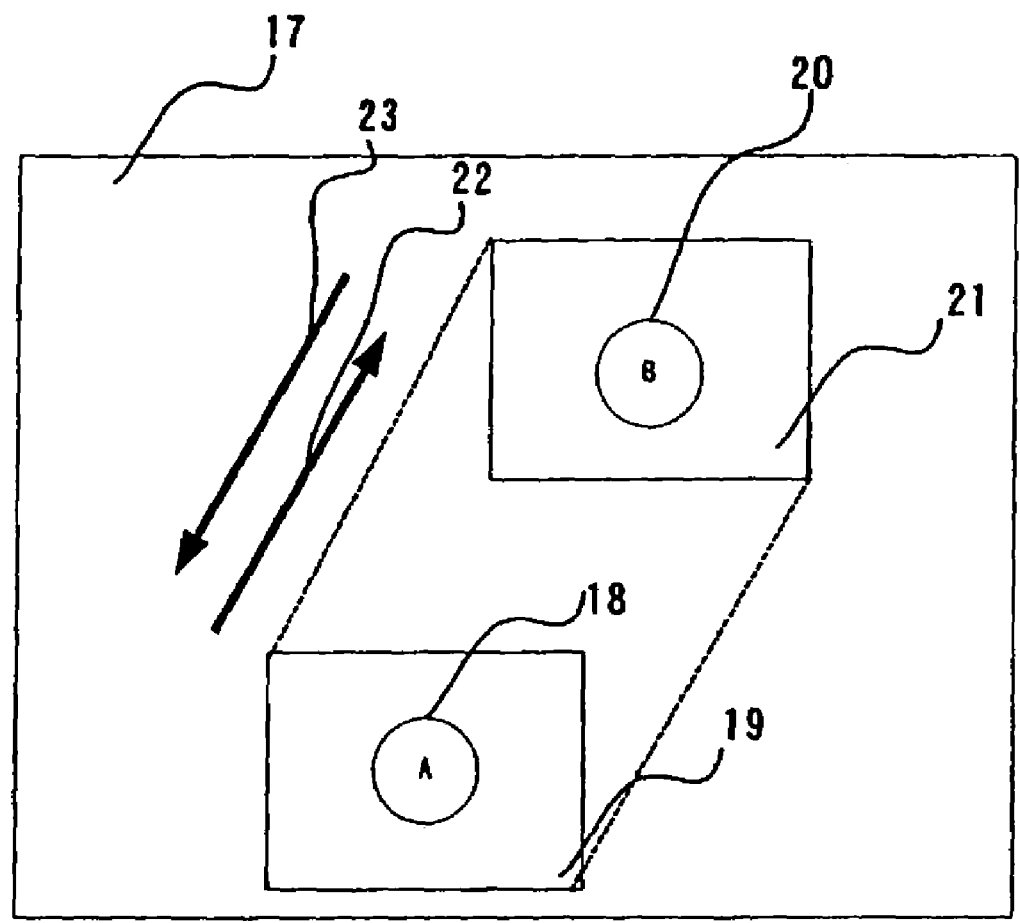
FIG. 5 is an explanatory view of switching the focus detecting areas in the video camera of Embodiment 1.

FIG. 5 shows switching from the one focus detecting area to the other focus detecting area which is used (which is brought into the state of being in-focus) through the AF operation) when the area changing switch 15 is operated during image-taking. In FIG. 5, reference numeral 17 shows an image-taking area, 18 shows an object A, 19 shows the focus detecting area a1 including the object A 18, 20 shows an object B, and 21 shows the focus detecting area a2 including the object B 19. Reference numerals 22 and 23 show directions of switching between the focus detecting areas when the area changing switch 15 is turned on and off.

In this manner, in Embodiment 1, two arbitrary focus detecting areas in the image-taking area are assigned to the turn-on and turn-off of the area changing switch 15 and stored in the storage circuit 9. Thus, the two focus detecting areas can be stored for the single switch (the area determining switch 16).

It should be noted that the position of the focus detecting area at the time of power-on may be the focus detecting area a1 or the focus detecting area a2 stored in the aforementioned storing processing, or may be set in the center of the image-taking area.

In Embodiment 1, the focusing processing is always continued during turn-on or turn-off of the area changing switch 15. However, the focus lens 2 may be fixed after focus processing is performed once for turn-on of the area changing switch 15. Alternatively, the focus lens 2 may be fixed after focusing processing is performed once for turnoff of the area changing switch 15. Alternatively, the focus lens 2 may be fixed after focusing processing is performed once for each of turn-on and turn-off of the area changing switch 15.

While Embodiment 1 has been described for the case where the single area changing switch 15 and the single area determining switch 16 are provided, a plurality of area changing switches 15 and a plurality of area determining switches 16 may be provided such that one focus detecting area is stored for turn-on and turn-off of each of the area changing switches 15. In addition, two area determining switches 16 may be provided, each for turn-on and turn-off of the area changing switch 15.

According to Embodiment 1, an operator can previously store a plurality of the focus detecting areas prior to image-taking, and can simply and quickly set one of the stored focus detecting areas for use by turning on or off the area changing switch 15 during image-taking.

Embodiment 2

Figure 6:
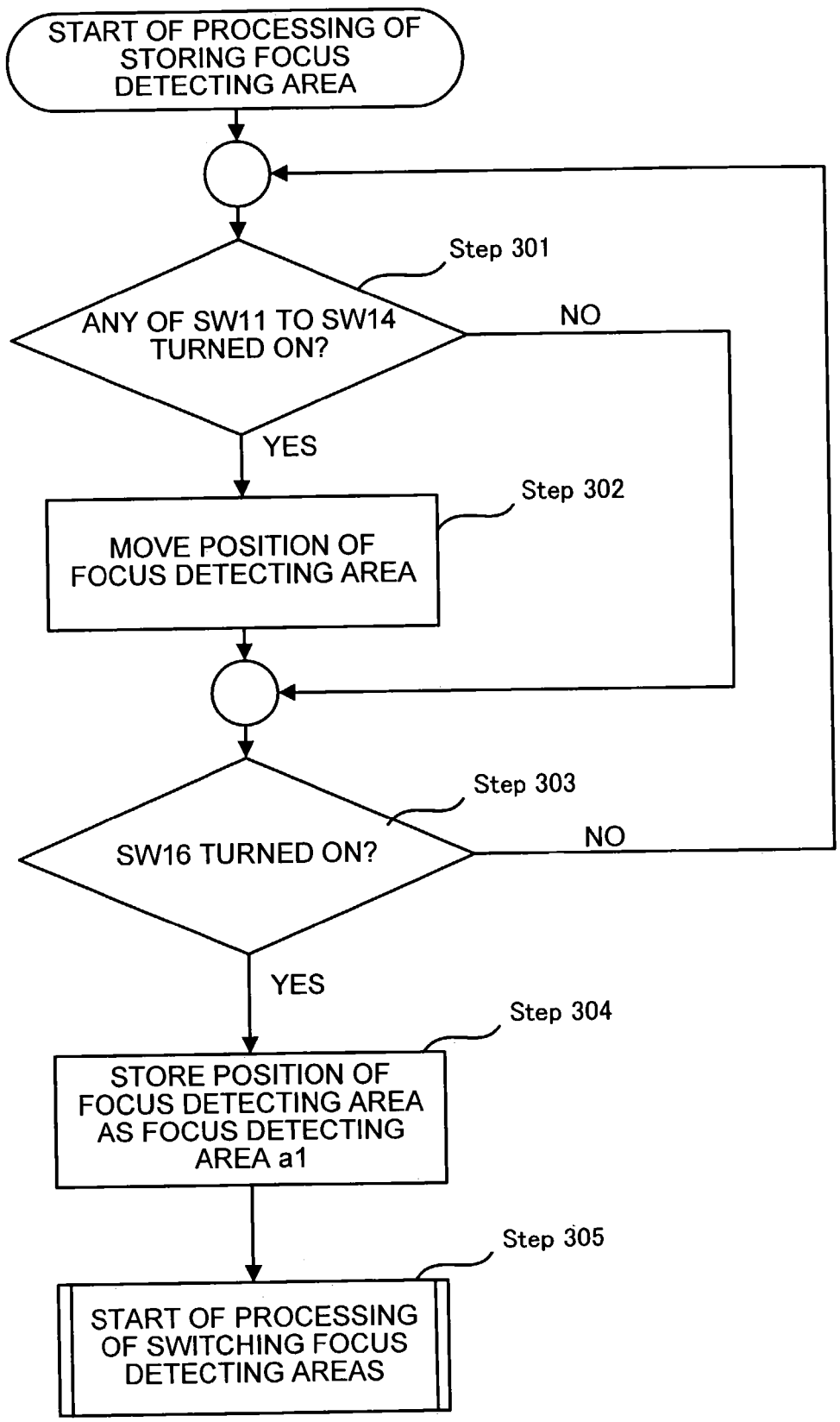
FIG. 6 is a flow chart showing processing of storing a focus detecting area in a video camera of Embodiment 2 of the present invention.

FIG. 6 is a flow chart showing the operation of processing of storing a focus detecting area performed by a control circuit in a video camera which is Embodiment 2 of the present invention. The basic structure of the video camera to which the present invention is applied is similar to that described in Embodiment 1. Components identical to those of Embodiment 1 are designated with the same reference numerals, and description thereof is omitted.

The following steps are performed in response to power-on of the video camera. At step 301 in FIG. 6, when any of area moving switches 11 to 14 is turned on, the flow proceeds to step 302 where the control circuit 6 moves the focus detecting area in a direction corresponding to the area moving switch which is turned on.

When none of the area moving switches 11 to 14 is turned on at step 301, the flow proceeds to step 303 with the position of the focus detecting area fixed.

When an area determining switch 16 is turned on at step 303, the flow proceeds to step 304 where the control circuit 6 assigns the position of the focus detecting area selected at this time as a focus detecting area a1 to the turn-on of an area changing switch 15 and stores the focus detecting area a1 in a storage circuit 9. When the area determining switch 16 is not turned on at step 303, the flow proceeds to step 301. Subsequent to step 304, the flow proceeds to the processing of switching focus detecting areas (Step 305) as described above.

It should be noted that the position of the focus detecting area at the time of power-on may be the focus detecting area a1 stored in the aforementioned storing processing or may be set in the center of the image-taking area.

In Embodiment 2, focusing processing is continued while the area changing switch 15 is turned on or off. However, a focus lens 2 may be fixed after focusing processing is performed once for turn-on of the area changing switch 15. Alternatively, the focus lens 2 may be fixed after focusing processing is performed once for turn-off of the area changing switch 15. Alternatively, the focus lens 2 may be fixed after focusing processing is performed once for each of turn-on and turn-off of the area changing switch 15.

While Embodiment 2 has been described for the case where the single area changing switch 15 and the single area determining switch 16 are provided, it is possible that a plurality of area changing switches 15 and a plurality of area determining switches 16 are provided such that one focus detecting area is stored for turn-on of each of the area changing switches 15.

According to Embodiment 2, an operator can previously store an arbitrary focus detecting area a1 prior to image-taking, and can simply and quickly set the stored focus detecting area a1 as the focus detecting area for use by turning on the area changing switch 15 during image-taking.

Embodiment 3

Figure 7:
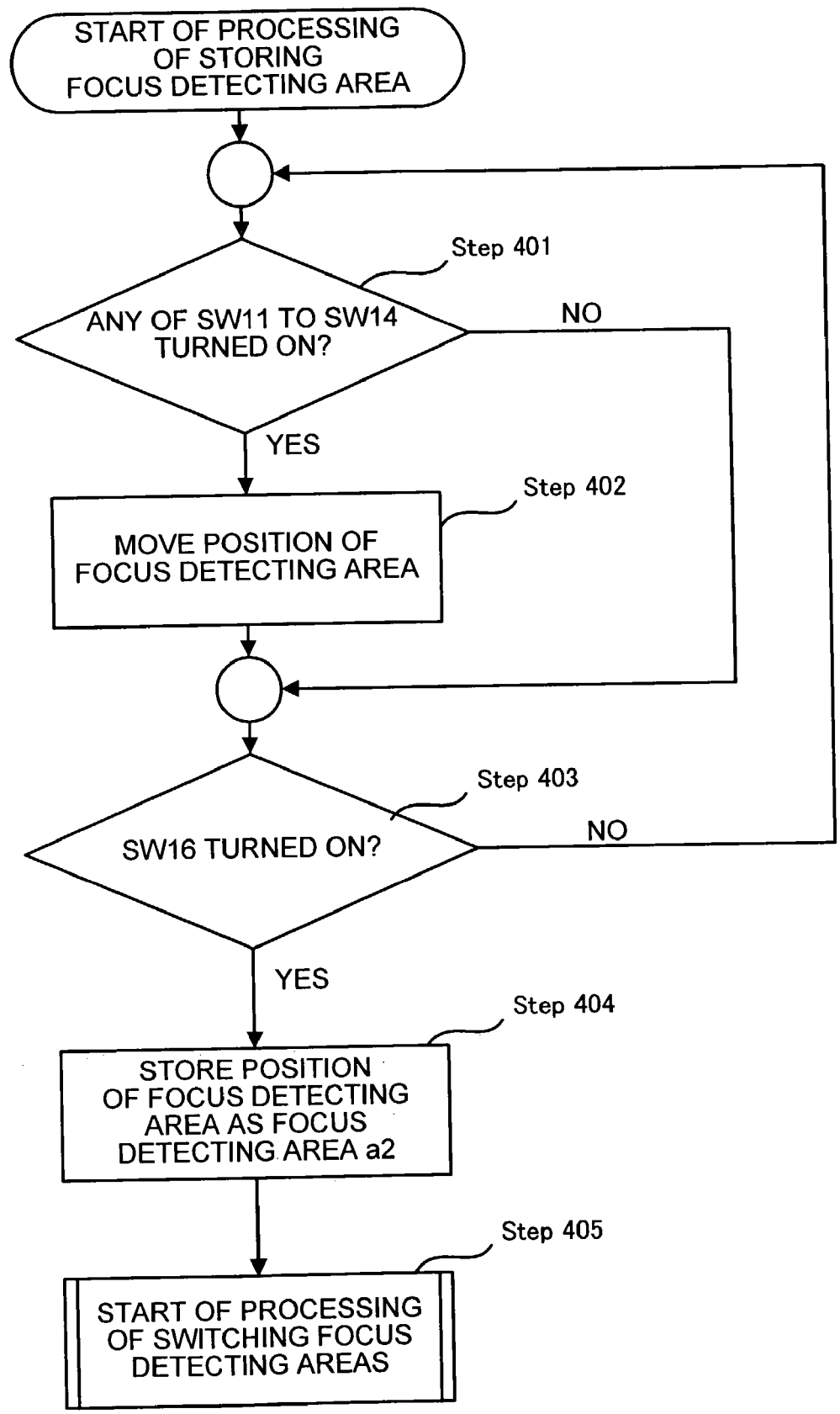
FIG. 7 is a flow chart showing processing of storing a focus detecting area in a video camera of Embodiment 3 of the present invention.

FIG. 7 is a flow chart showing the operation of processing of storing a focus detecting area performed by a control circuit in a video camera which is Embodiment 3 of the present invention. The basic structure of the video camera to which the present invention is applied is similar to that described in Embodiment 1. Components identical to those of Embodiment 1 are designated with the same reference numerals, and description thereof is omitted.

The following steps are performed in response to power-on of the video camera. At step 401 in FIG. 7, when any of area moving switches 11 to 14 is turned on, the flow proceeds to step 402 where the control circuit 6 moves the focus detecting area in a direction corresponding to the switch which is turned on.

When none of the area moving switches 11 to 14 is turned on at step 401, the flow proceeds to step 403 with the position of the focus detecting area fixed.

When an area determining switch 16 is turned on at step 403, the flow proceeds to step 404 where the control circuit 6 assigns the position of the focus detecting area selected at this time as a focus detecting area a2 to the turn-off of the area changing switch 15 and stores the focus detecting area a2 in a storage circuit 9. When the area determining switch 16 is not turned on at step 403, the flow proceeds to step 401. Subsequent to step 404, the flow proceeds to the processing of switching focus detecting areas (Step 405) as described above.

It should be noted that the position of the focus detecting area at the time of power-on may be the focus detecting area a2 stored in the aforementioned storing processing or may be set in the center of the image-taking area.

In Embodiment 3, focusing processing is continued while the area changing switch 15 is turned on or off. However, a focus lens 2 may be fixed after focusing processing is performed once for turn-on of the area changing switch 15. Alternatively, the focus lens 2 may be fixed after focusing processing is performed once for turn-off of the area changing switch 15. Alternatively, the focus lens 2 may be fixed after focusing processing is performed once for each of turn-on and turn-off of the area changing switch 15.

While Embodiment 3 has been described for the case where the single area changing switch 15 and the single area determining switch 16 are provided, it is possible that a plurality of area changing switches 15 and a plurality of area determining switches 16 are provided such that one focus detecting area is stored for turn-on of each of the area changing switches 15.

According to Embodiment 3, an operator can previously store an arbitrary focus detecting area a2 prior to image-taking, and can simply and quickly set the stored focus detecting area a2 as a focus detecting area for use by turning on the area changing switch 15 during image-taking.

Embodiment 4

Figure 8:
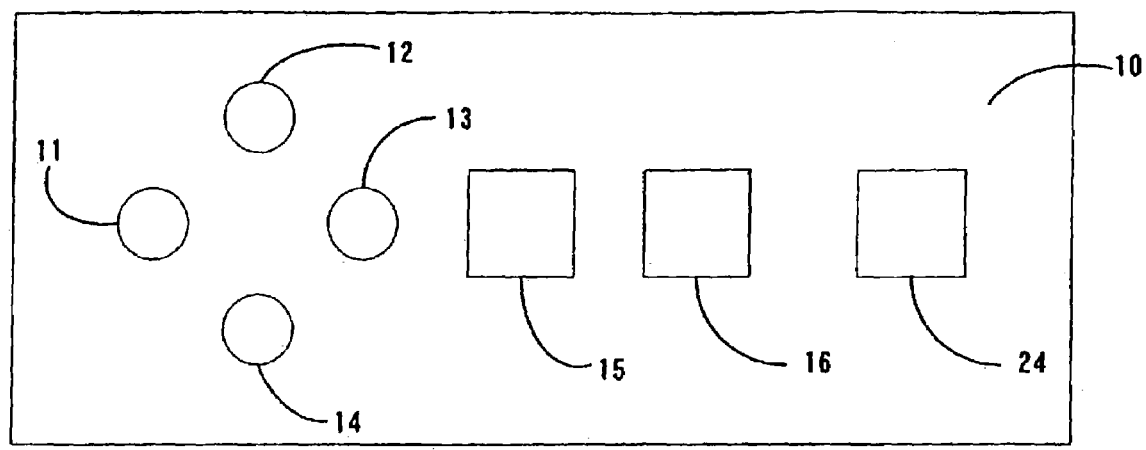
FIG. 8 is a block diagram showing the structure of an operating section in a video camera of Embodiment 4 of the present invention.
Figure 9:
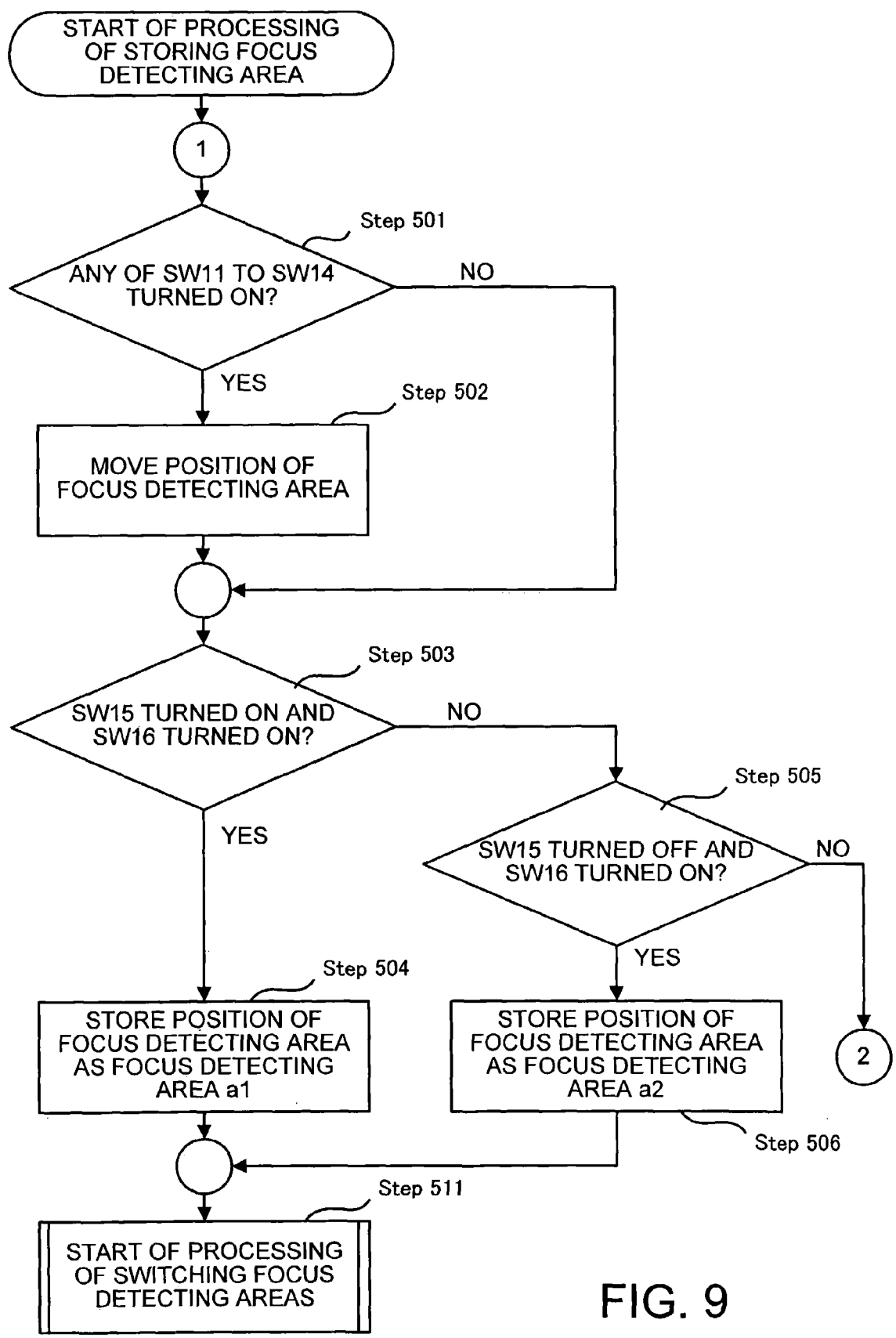
FIG. 9 is a flow chart showing processing of storing a focus detecting area in Embodiment 4.
Figure 10:
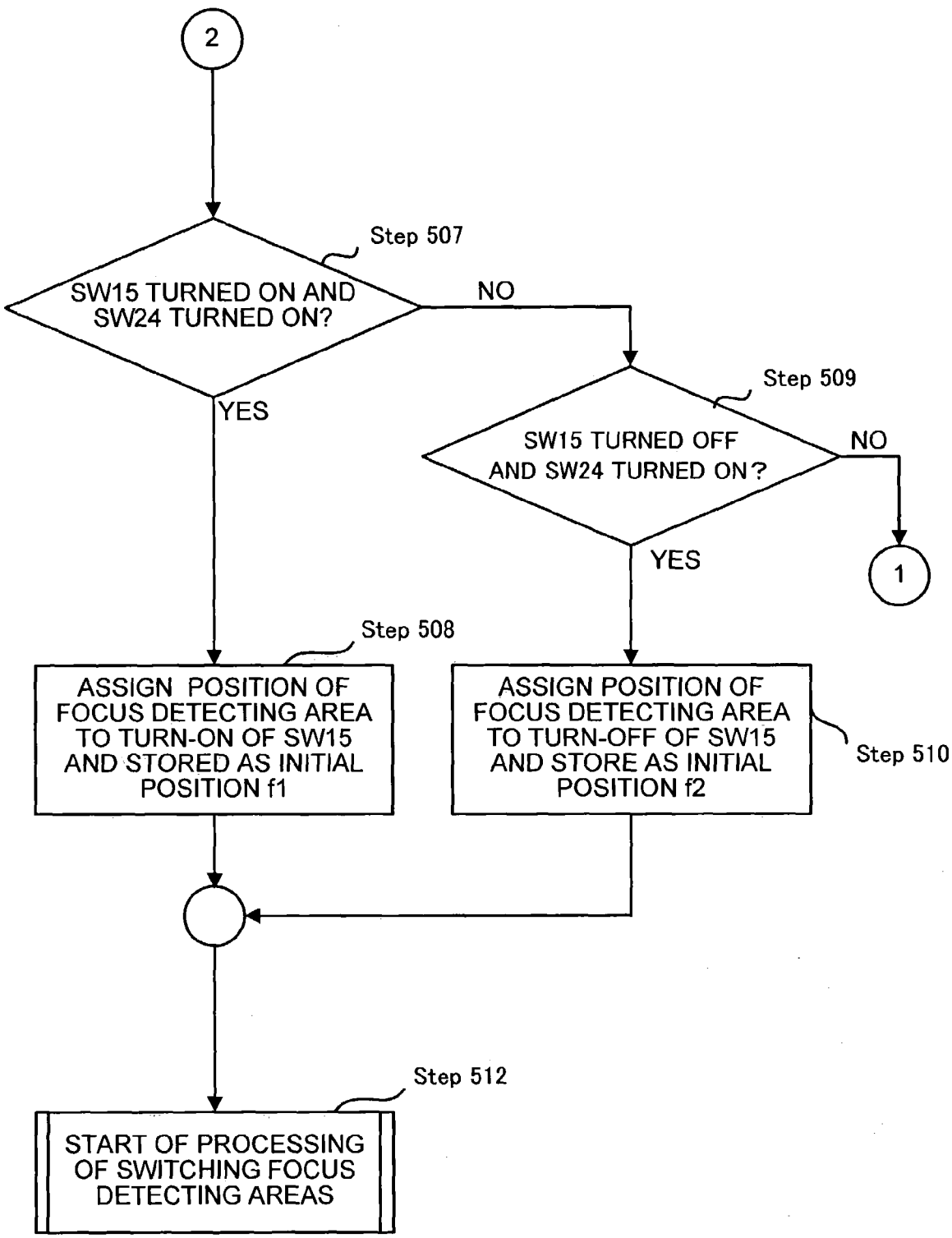
FIG. 10 is a flow chart showing the processing of storing a focus detecting area in Embodiment 4 subsequent to the flow in FIG. 9.
Figure 11:
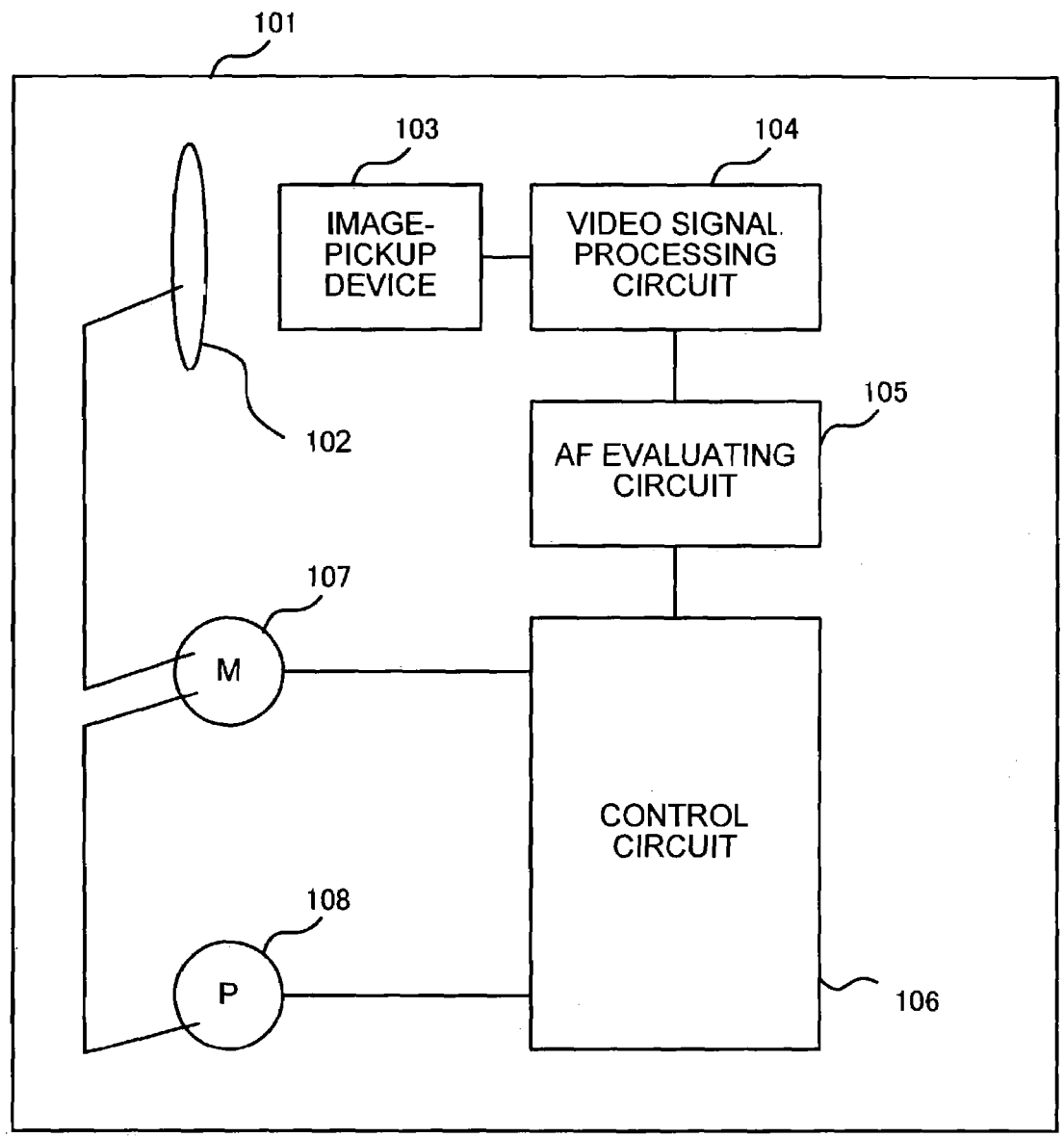
FIG. 11 is a block diagram showing the structure of a conventional video camera.

FIG. 8 shows the structure of a focus detecting area operating section 10 of a video camera which is Embodiment 4 of the present invention. FIGS. 9 and 10 are flow charts showing the operation of processing of storing a focus detecting area performed by a control circuit 6 in the video camera. In Embodiment 4, components identical to those of Embodiment 1 are designated with the same reference numerals, and description thereof is omitted.

In FIG. 8, reference numeral 11 to 16 show switches identical to those in Embodiment 1. Reference numeral 24 shows a switch for determining an initial position of the focus detecting area.

Processing associated with switching of focus detecting areas performed by the control circuit 6 in Embodiment 4 can be classified into processing of storing a focus detecting area and processing of switching focus detecting areas, similarly to Embodiment 1. The processing of switching focus detecting areas, however, is similar to Embodiment 1, so that the general flow of the storing processing is described with reference to FIGS. 8 and 1.

When the initial position determining switch 24 is turned on together with an area changing switch 15, the position of the focus detecting area at the time of power-on of the video camera can be assigned to the area changing switch 15 and stored in a storage circuit 9. In this case, the aforementioned non-volatile storage circuit is used as the storage circuit 9. In this manner, an arbitrary position of the focus detecting area can be assigned to the area changing switch 15 as the initial position.

Next, processing performed by the control circuit 6 in the aforementioned storing processing is described with reference to FIGS. 9 and 10. The following steps are performed in response to power-on of the video camera.

At step 501 in FIG. 9, when any of area moving switches 11 to 14 is turned on, the control circuit 6 moves the focus detecting area in a direction corresponding to the switch which is turned on, at step 502.

When none of the area changing switches 11 to 14 is turned on at step 501, the flow proceeds to step 503 without moving the focus detecting area.

At step 503, when the area determining switch 16 is turned on with the area changing switch 15 turned on, the flow proceeds to step 504 where the control circuit 6 assigns the position of the focus detecting area selected at that time to the turn-on of the area changing switch 15 as a focus detecting area a1 and stores the area a1 in the storage circuit 9.

At step 503, when the area determining switch 16 is not turned on with the area changing switch 15 turned on, the flow proceeds to step 505.

At step 505, when the area determining switch 16 is turned on with the area changing switch 15 turned off, the flow proceeds to step 506. At step 506, the control circuit 6 assigns the position of the focus detecting area selected at that point to the turn-off of the area changing switch 15 as a focus detecting area a2 and stores the area a2 in the storage circuit 9.

On the other hand, when the area determining switch 16 is not turned on with the area changing switch 15 turned off at step 505, the flow proceeds to step 507 in FIG. 10. In FIGS. 9 and 10, the same circled figures show links in the flow. Subsequent to step 504 and step 506, the flow proceeds to the processing for switching focus detecting areas (Step 511) similar to that shown in FIG. 4 in Embodiment 1.

The processing from step 507 is provided for storing the initial position. At step 507, when the initial position determining switch 24 is turned on with the area changing switch 15 turned on, the flow proceeds to step 508 where the control circuit 6 assigns the position of the focus detecting area selected at that time to the turn-on of the area changing switch 15 as an initial position f1 and stores the position f1 in the storage circuit 9. When the initial position determining switch 24 is not turned on with the area changing switch 15 turned on at step 507, the flow proceeds to step 509.

When the initial position determining switch 24 is turned on with the area changing switch 15 turned off at step 509, the flow proceeds to step 510 where the control circuit 6 assigns the position of the focus detecting area selected at that time to the turn-off of the area changing switch 15 as an initial position f2 and stores the position f2 in the storage circuit 9.

When the initial position determining switch 24 is not turned on with the area changing switch 15 turned off at step 509, the flow returns to step 501.

Subsequent to step 508 and step 510, the flow proceeds to processing of switching the focus detecting areas (Step 512) described above.

As described above, according to Embodiment 4, an operator stores two arbitrary focus detecting areas as the initial positions f1 and f2 in the storage circuit 9 and assigns them to turn-on and turn-off of the area changing switch 15, respectively, so that a desired focus detecting area can be set quickly by selecting turn-on or turn-off of the area changing switch 15 at the time of power-on. In addition, when the initial positions f1 and f2 are the same as the focus detecting areas a1 and a2, it is possible to eliminate the need to perform the processing of storing the focus detecting areas a1 and a2 each time the power is turned on.

On the other hand, when the focus detecting areas a1 and a2 are additionally stored, the operator can simply and quickly set one of the two stored focus detecting areas a1 and a2 for use by turning on or off the area changing switch 15.

Focusing processing is continued while the area changing switch 15 is turned on or off in Embodiment 4, as in Embodiment 1. However, a focus lens 2 may be fixed after focusing processing is performed once for turn-on of the area changing switch 15. Alternatively, the focus lens 2 may be fixed after focusing processing is performed once for turn-off of the area changing switch 15. Alternatively, the focus lens 2 may be fixed after focusing processing is performed once for each of turn-on and turn-off of the area changing switch 15.

While Embodiment 4 has been described for the case where the single initial position determining switch 24 and the single area changing switch 15 are provided, it is possible that a plurality of initial position determining switches 24 and a plurality of area changing switches 15 are provided such that one focus detecting area is stored as an initial position for turn-on and turn-off of each of the area changing switches 15. In addition, two initial position determining positions 24 may be provided, each for turn-on and turn-off of the area changing switch 15.

When the initial position determining switch 24 is turned on, the only one focus detecting area selected at that time may be assigned to turn-on or turn-off of the area changing switch 15 and stored as an initial position. In this case, the processing of storing the focus detecting area is modified in such a manner that, when the initial position determining switch 24 is turned on at step 303 or 403 described in FIG. 6 or 7, the focus detecting area selected at that time is stored in the storage circuit 9 as an initial focus detecting area f1 or f2 at step 304 or 404.

According to each of Embodiments 1 to 4, even when an operator intends to take an image of an object positioned off the center of the image-taking area in the optical apparatus provided with the AF function, the image can be taken without complicating the operation or hindering other operations.

While preferred embodiments have been described, it is to be understood that modification and variation of the present invention may be made without departing from the scope of the following claims.

What is claimed is:

1. An optical apparatus comprising:
an optical system which includes a focus lens and forms an object image;
an image-pickup device which receives the object image formed by the optical system and photoelectrically converts the object image;

a focusing state calculating circuit which derives information indicating a focusing state of the optical system based on an output signal from an image-pickup area which corresponds to part of the image-pickup device;

a storage circuit which stores a position of the image-pickup area in the image-pickup device; and a setting system which moves the image-pickup area, stores a position of the image-pickup area in the storage circuit, and sets the image-pickup area which has been stored in the storage circuit as the image-pickup area in performing focus adjustment control, wherein the setting system comprises, a first switch which is operated to instruct the image-pickup area in the image-pickup device to be moved;

a second switch which is operated to instruct a position of the image-pickup area to be stored in the storage circuit;

a third switch which is operated to instruct the image-pickup area to be switched;

a fourth switch which is operated to instruct an initial position of the image-pickup area to be stored in the storage circuit; and a control circuit which performs the focus adjustment control by driving the focus lens based on the information derived by the focusing state calculating circuit and is electrically connected to the first switch, the second switch, the third switch and the fourth switch to operate in accordance with a state of each of the switches, wherein the control circuit moves the image-pickup area in response to operation of the first switch, the control circuit stores, in response to operation of the second switch, the position of the image-pickup area selected at the time of that operation in the storage circuit, the control circuit sets the image-pickup area which has been stored in the storage circuit in accordance with a state of the third switch in performing the focus adjustment control, the control circuit assigns, in response to the operation of the fourth switch, the position of the image-pickup area selected at the time of that operation to a state of the third switch and stores that position in the storage circuit as the initial position, and at the time of power-on of the optical apparatus, in accordance with the state of the third switch, the control circuit sets the image-pickup area assigned to that state and stored in the storage circuit as the image-pickup area in the focus adjustment control.

2. The optical apparatus according to claim 1, wherein the control circuit assigns, in response to the operation of the fourth switch, the position of the image-pickup area selected at the time of that operation to the state of the third switch at that time and stores that position in the storage circuit as the initial position.

3. The optical apparatus according to claim 1, wherein, at the time of power-on of the optical apparatus, the control circuit sets the image-pickup area assigned to a non-operated state of the third switch and stored as the initial position in the storage circuit as the image-pickup area when the third switch is not operated, and sets the image-pickup area assigned to an operated state of the third switch and stored as the initial position in the storage circuit as the image-pickup area when the third switch is operated.

4. The optical apparatus according to claim 2, wherein, at the time of power-on of the optical apparatus, the control circuit sets the image-pickup area assigned to a non-operated state of the third switch and stored as the initial position in the storage circuit as the image-pickup area when the third switch is not operated, and sets the image-pickup area assigned to an operated state of the third switch and stored as the initial position in the storage circuit as the image-pickup area when the third switch is operated.

* * * * *